Feb. 29, 1944.   A. J. BRAY   2,342,835
BELT SPLICE CUTTING MACHINE
Filed March 9, 1942   2 Sheets-Sheet 1

Witness
Charles T. Olson

Inventor
Alfred J. Bray
by his attorneys
Fish Hildreth Cary & Jenney

Feb. 29, 1944. A. J. BRAY 2,342,835
BELT SPLICE CUTTING MACHINE
Filed March 9, 1942  2 Sheets-Sheet 2

Witness
Charles T. Olson

Inventor
Alfred J. Bray
by his attorneys

Patented Feb. 29, 1944

2,342,835

UNITED STATES PATENT OFFICE 2,342,835

BELT SPLICE CUTTING MACHINE

Alfred J. Bray, Holliston, Mass.

Application March 9, 1942, Serial No. 433,850

6 Claims (Cl. 164—50)

The present invention relates to an improved belt splice, and to methods and apparatus for making such splice.

Among the various types of belt splices employed to join the ends of power transmission belts of leather or the like, the types used most frequently each possess certain undesirable features. One type in general use is the lapped and cemented splice, formed by skiving at a very slight angle the two ends of the belt to provide a long overlap whose thickness at any point in the lap is little if any more than the thickness of the belt itself. Such splice is however somewhat stiffer than the remainder of the belt by reason of the large cemented area, and likewise involves a considerable waste of material due to the length of the skived overlap.

The other type of splice is the laced or metallic fastener type, with abutting ends joined either by special connectors or by sewing with soft wire. Such a splice, while fairly flexible, tends to "pound" over pulleys, and is of considerably less strength than the rest of the belt, with the result that the fastenings frequently pull through the leather or tear out under heavy loads.

The present invention has as an object the provision of a belt splice of improved design, requiring in most cases no added fastenings and involving but little waste of material, while providing a strong and relatively flexible joint which may be quickly and easily assembled.

Another object of the invention is to provide a machine by which the cuts for the improved belt splice of the invention may be made speedily and accurately without the exercise of particular skill.

In accordance with these objects, the invention contemplates the provision of an interlocking, dovetail splice wherein the interconnecting dovetailed portions of the belt ends are tapered transversely of the belt thickness to permit the parts to be assembled readily without causing the cement, applied before assembly to abutting edges of the parts, to be scraped away during the assembly.

As another feature, the invention discloses a tool or machine for cutting the tapered dovetails in the ends of the belt, the machine being arranged to secure, with a minimum of skill on the part of the operator, accurately cut parts which may then be quickly and easily assembled without special tools or skill to form a smooth strong joint.

Figure 1:
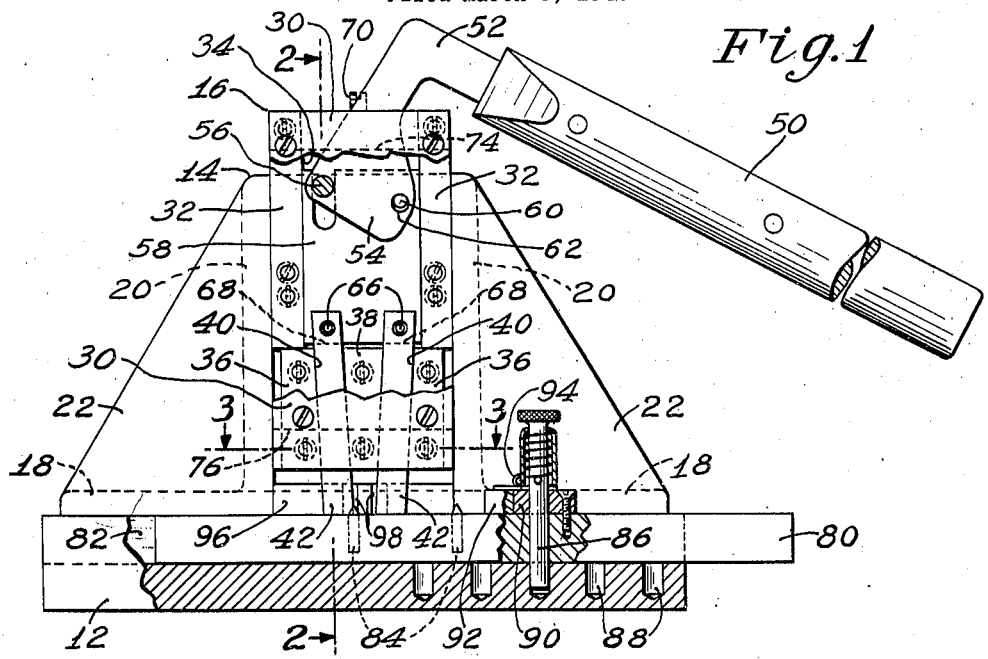
Figures 2, 3:
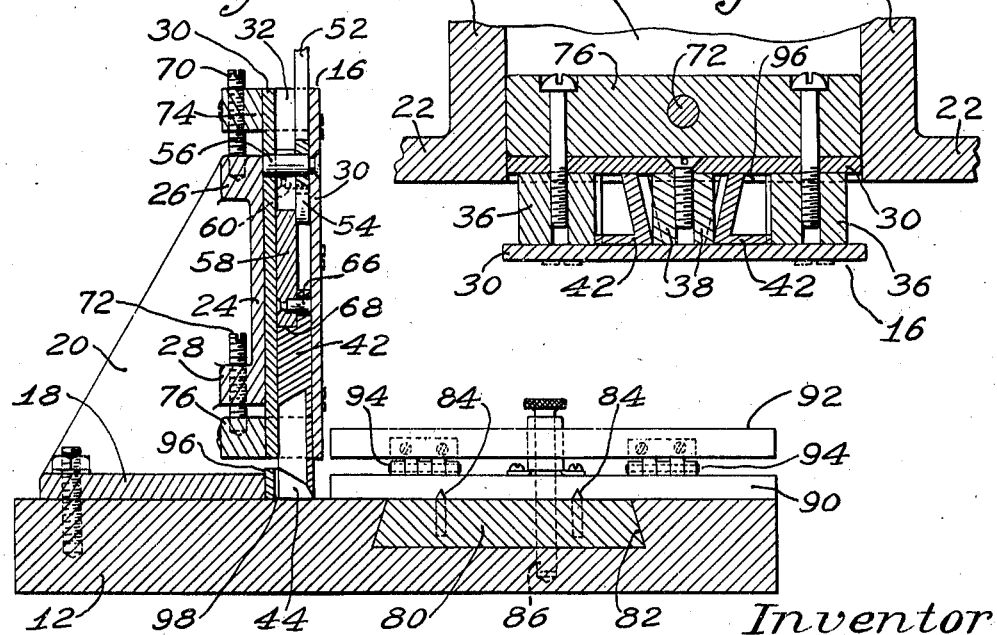
Figure 4:
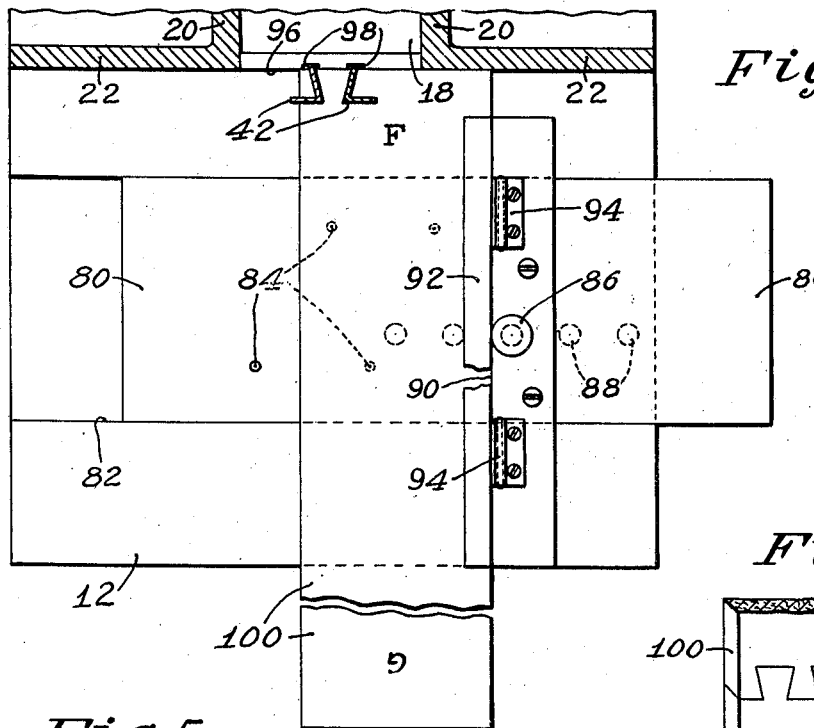
Figure 6:
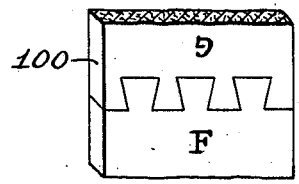
Figure 5:
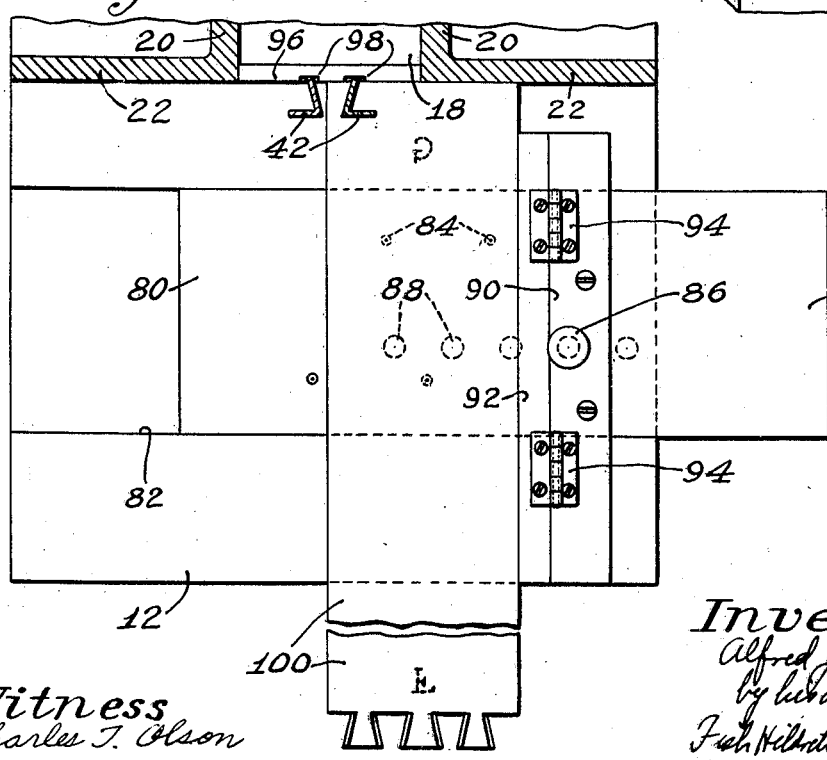

In the drawings, Fig. 1 is a view in front elevation, partly broken away and in section, of the belt splicing machine of the invention; Fig. 2 is a view of the machine in left side elevation, partly in section and taken along the line 2—2 of Fig. 1; Fig. 3 is a detail top plan view of the cutting head, taken along the line 3—3 of Fig. 1; Fig. 4 is a simplified plan view showing the position of the parts in making the first cut in one end of the belt; Fig. 5 is a view similar to Fig. 4 but showing the parts in position for cutting the first cut in the other end of the belt, the cutting of the first end of the belt having been completed; and Fig. 6 is a view of the belt splice formed by assembling the dovetailed belt ends after cutting.

The belt splicing machine by which the tapering dovetails are cut in the belt ends comprises a base or bed 12 to which is secured a support 14 for the cutter unit, indicated generally at 16. While the support may be of any suitable design, that illustrated has been found to provide the required strength and rigidity. The support comprises a base 18, which is bolted to the bed 12, parallel rearwardly directed flanges or webs 20, and side flanges 22. The flanges 20 are joined by a web 24 which is set back slightly from the plane of the side flanges 22 to provide a shallow guideway within which the cutter unit is received. At its top and bottom the web 24 is strengthened by portions 26 and 28 of enlarged cross section (see Figure 2).

The cutter unit 16 comprises plates 30 secured to upper spacing blocks 32 to define a guideway portion 34 in the upper portion of the cutter unit, while lower spacing blocks 36 and central block 38 define spaced converging guideways 40 in the lower portion of the unit. Mounted in these guideways 40 are the cutter knives 42, preferably formed out of solid stock by grinding the lower portions to the cross-sectional shape illustrated in Figures 3, 4 and 5, and then sharpening the ends 44 to provide sharp cutting edges disposed at an acute angle to one another.

The knives are raised and lowered in their guideways by means of a handle 50 mounted on and forming an extension of a bent lever 52 having an enlarged end 54 pivoted on a pin 56 between the plates 30 of the cutter unit. Rocking movement of the handle serves to raise and lower a block 58 sliding in the upper guideway of the unit, the lever being connected to the block by means of a pin 60 in the block, the pin passing through a slightly oversize hole 62 in the lever to avoid bending due to changes in distance from the pin to pivot 56.

The block is connected to the cutter knives 42 by a similar pin and oversize-hole type connections 66. The pins are depended upon, however, only for raising the knives after a cut, the downward pressure during cutting being transmitted directly from block 58 to the knives through contact of the lower edge of the block with a shoulder 68 at the top of each knife.

The cutter unit is secured to its supporting frame 14 by means of upper and lower set screws 70 and 72, the top screw passing through a block 74 on the cutter unit and engaging a socket in the upper cross rib 26 while the lower set screw is threaded through the lower rib 28 of the frame 14 and seats against block 76 secured to the base of the cutter unit. By loosening the upper set screw and tightening the lower, the cutter unit may be bodily lowered and secured in adjusted position, while loosening the lower screw 72 and tightening the upper serves to raise the unit relative to the frame 14 and base 12. This enables the spacing between the cutter knives to be accurately adjusted to provide the desired size of dovetail, since the knives, at any given level relative to the plane of the base 12, are brought closer together when the cutter unit is raised and are separated when the cutter unit is adjusted to a lower position.

The cutting of a series of dovetails across the end of a belt requires that the position of the belt be changed for each dovetail to be cut. To this end, there is provided a cross slide 80 operating in an undercut guideway 82 in the base 12. Sharpened pins 84 assist in holding the belt against slipping, once the belt has been placed on the slide. The slide is locked in each position, preparatory to the cutting of the corresponding dovetail, by means of retractible pin 86 and registering holes 88 spaced at dovetail intervals.

The belt is positioned on the slide and held at right angles thereto by means of an edge gage 90. This however serves only when cutting one end of the belt, since it is necessary that the cuts for the other end be displaced to one side by half the distance between dovetails, in order that a dovetail at one end may fit into a space of complementary shape in the other end of the belt. This half-dovetail displacement is effected by a supplementary edge gage 92 secured by hinges 94 to the main edge gage 90. For one end, the gage 94 may be swung up out of the way, as in Figure 4, while the other end of the belt is cut with the supplementary gage down and engaged by the side edge of the belt (Figure 5). The belt end butts against a fixed stop 96 having cut-outs 98 for the knives.

In describing the mode of operation in cutting the ends of a belt 100 in the machine, it will be assumed that the belt has had its ends cut off square at the proper points, and has marked on one face adjacent one end the letter F, and at the other end, on the same face, the letter G. The belt is illustrated in Figs. 4 and 5 as broken in order that both ends may appear as if the belt were stretched out flat.

For cutting the first, or F end of the belt, the edge gage 90 will be positioned as shown in Fig. 4, so that the center line of the first dovetail is spaced from the belt edge a distance approximately two-thirds of the spacing between dovetails, center line to center line. As handle 50 is forced down to make the first cut, the knives cut each side of the dovetail and likewise the adjacent base lines. After withdrawing the knives, the cross slide is moved to bring the pin into register with the next hole, and the second dovetail cut. This process is repeated until the full width of the belt has been cut in dovetails, the final cut being either a space of partial dovetail shape or an incomplete dovetail in the material, depending upon the width of the belt.

After the end F has been cut, the belt is turned end for end and upside down to bring the end G to the machine. If for example end F was cut with the grain side up, assuming a leather belt, then end G will be cut with the flesh side at the top. In order for the dovetails of the G end to fit into the spaces between the dovetails of the F end, the supplementary edge gage 92 is swung down to shift the belt position on the slide a distance equal to half the spacing between dovetail center lines, as shown in Fig. 5. As a result, the first cut forms an incomplete dovetail, complementary to the incomplete dove-tail shaped space of the F end. With the belt held in this same position, successive dovetails are cut, the cross slide being shifted from hole to hole, as before.

To complete the splice, the edges of the dovetailed ends of the belt are coated with a cement appropriate to the material of the belt and the parts fitted together in interlocking fashion, as shown in Fig. 6. Due to the tapering of the dovetails, the cement on the edges of the material is not scraped away as the parts are forced together, since clearance is provided between abutting edges up until the time the parts reach a substantially flush relation. As a result, the cement is forced into the material and a tight bond secured, so that as a general rule no added fastenings of any sort are required, even for the outer, incomplete dovetail portions. The interlocking nature of the splice possesses high inherent strength in tension, while the short length of the splice in the direction of the belt not only impairs but little the flexibility of the belt, but also involves a minimum waste of material.

Normally, the heightwise position of the cutter unit on its supporting frame will need changing infrequently. Such adjustment, however, affords extremely accurate control of the dovetail size, by changing the knife spacing as hereinbefore described. As a result, the exact size of dovetail to obtain a flush joint may be readily obtained for any thickness of belt to be spliced by the machine.

While the particular construction of the machine and its arrangement in respect to shape and spacing of the dovetails may be varied to suit particular requirements, it may be demonstrated that a spacing between dovetail center lines of approximately three-quarters of an inch, with the dovetails roughly one-half inch in average or median width at their outer ends and one-quarter inch in median width at their bases, will permit belts of conventional dimensions, varying in width by one-half inch steps up to the full capacity of the machine, to be cut and spliced effectively without encountering an unsuitable termination of either space or dovetail at the belt edge.

Having thus described the invention, I claim:

1. A machine for cutting tapered dovetails in a belt preparatory to making an interlocking dovetail belt splice, said machine comprising a support for the belt, a cutting unit, cutting knives carried by said unit and movable toward and from the belt along diverse lines, means for actuating said knives to cut a tapering dovetail in the belt, and means providing relative transverse adjustment of cutting unit and belt to enable the cutting of a series of spaced tapered dovetails.

2. A machine for cutting tapered dovetails in a belt preparatory to making an interlocking dovetail splice, said machine comprising a support for the belt, a cutting unit, means for providing relative transverse adjustment of belt and cutting unit, cutting knives carried by said unit and movable toward the belt along converging paths, said knives having cutting edges disposed in acute angle relation whereby both edges of a dovetail and at least a part of the adjacent belt material may be cut at a single operation of said knives.

3. A machine for cutting tapered dovetails in a belt preparatory to making an interlocking dovetail belt splice, said machine comprising a support for the belt, a cutting unit, cutting knives carried by said unit and operable to cut a tapering dovetail in a single operation, means for relatively positioning the belt and cutting unit transversely in successive positions to cut a series of spaced tapered dovetails across one end of the belt, and for relatively positioning the belt and cutting unit in successive positions displaced from the first series to cut a series of spaced tapered dovetails across the other end of the belt complementary to the spaces between the dovetails of the first series, and tapering in the opposite direction.

4. A machine for cutting tapered dovetails in a belt preparatory to making an interlocking dovetail splice, said machine comprising a support for the belt, a cutter unit provided with knives movable toward the belt along converging paths, and means for altering the heightwise position of the cutting unit relative to the level of the belt to vary the spacing between the knives at the belt.

5. A machine for cutting tapered dovetails in a belt preparatory to making an interlocking dovetail splice, said machine comprising a cutter unit provided with knives movable toward the belt along converging paths, and means for supporting a belt in a series of positions, transversely of the cutter, corresponding to each dovetail to be cut.

6. A machine for cutting tapered dovetails in a belt preparatory to making an interlocking dovetail splice, said cutter comprising a cutter unit provided with cutter knives movable toward the belt along converging paths, a belt supporting slide movable transversely of the cutter, slide positioning devices for locating the slide in a series of positions corresponding to each dovetail to be cut, belt edge engaging means for positioning the belt on the slide while a series of dovetails is cut across one end of the belt, and supplementary belt edge engaging means for positioning the belt on the slide displaced from its first position thereon by half the distance between dovetails to enable a series of dovetails to be cut in the other end of the belt.

ALFRED J. BRAY.